Nov. 16, 1948.  E. A. SCHMIDT  2,453,865

RESISTANCE UNIT FOR FLASHLIGHTS

Filed Nov. 13, 1944

INVENTOR.
ELMER A. SCHMIDT
BY
Kwis Hudson, Boughton & Williams
ATTORNEYS

Patented Nov. 16, 1948

2,453,865

UNITED STATES PATENT OFFICE 2,453,865

RESISTANCE UNIT FOR FLASHLIGHTS

Elmer A. Schmidt, Cleveland, Ohio, assignor to Willard Storage Battery Company, Cleveland, Ohio, a corporation of West Virginia Application November 13, 1944, Serial No. 563,130

8 Claims. (Cl. 201—67)

This invention relates to improvements in resistance units, particularly a unit which may be employed as an adapter for mounting a storage battery of the flashlight type in brackets intended to receive a dry battery of somewhat lower voltage.

It sometimes becomes desirable to replace small dry batteries of a standard voltage, such as one and one-half volts, with storage batteries having a voltage of two or thereabouts, the apparatus with which the battery is used being designed for the lower voltage. One example of such a case is the A battery of a hearing aid pack. Another is the substitution of a two volt storage battery-resistance assembly for the conventional one and one-half volt battery of a flashlight.

One of the objects of my invention is the provision of a resistance unit which may be mounted along with the battery without any additional mounting parts and which by its resistance shall insure a current of the same strength as that produced by the dry battery which it replaces.

Another object is the provision of a unit of the character stated which shall have the appearance of being a part of the battery itself.

Still another object is the provision of a unit of the character stated so constituted that it is practically impossible to improperly assemble it upon the battery.

Other objects and features of novelty will appear as I proceed with the description of that embodiment of the invention which, for the purposes of the present application, I have illustrated in the accompanying drawing, in which Fig. 1 is an elevational view of a storage battery in connection with which the unit of the present invention is intended to be used.

Figure 1:
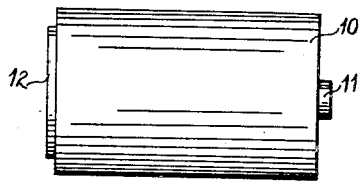
Figure 2:
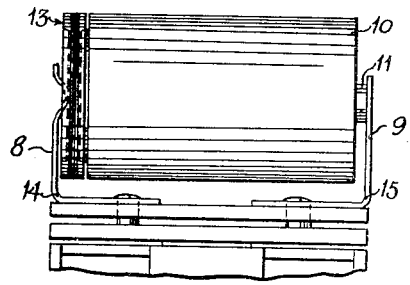
Fig. 2 is a similar view of the battery and unit assembly mounted between contact brackets.
Figure 3:
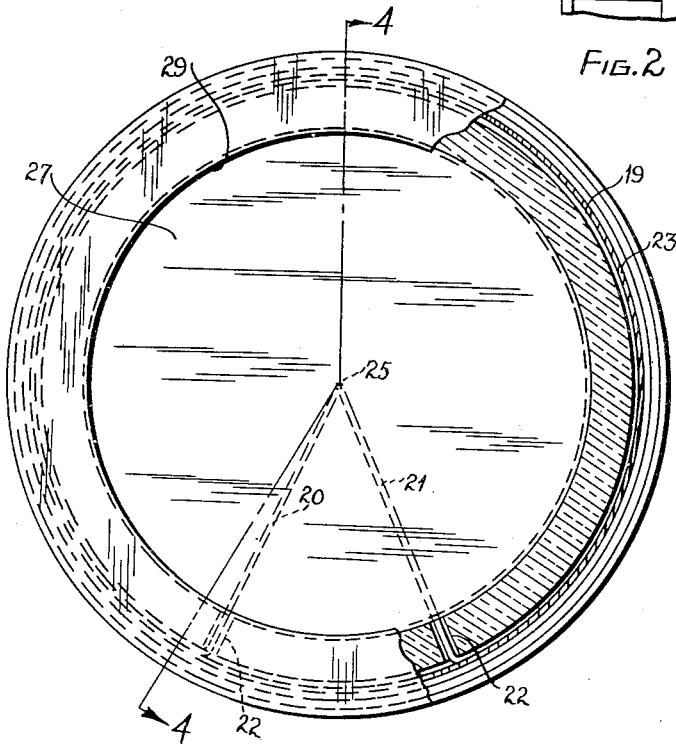
Fig. 3 is a large scale side elevation, partly in section, of a resistance unit embodying the invention.
Figure 4:
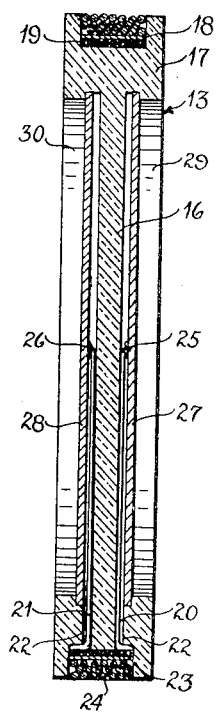
Fig. 4 is a cross-sectional view taken substantially on the line 4—4 of Fig. 3.

In the drawing I have shown at 10 a storage battery which may be of a well-known cylindrical form and may have a small terminal 11 disposed centrally at one end of the battery and a larger disk-shaped terminal 12 at its opposite end.

The resistance unit 13 of the present invention is of the same diameter as the battery 10 and fits against one end of the battery in a manner to appear upon casual inspection to be a part thereof, these two elements 10 and 13 being adapted to be handled together as a subassembly when they are inserted into a hearing pack or the like, for example between brackets 14 and 15 having spring metal arms 8 and 9 adapted to engage and grip the ends of the assembly. The brackets 14 and 15 constitute parts of an electric circuit which includes the battery and the resistance unit.

The resistance unit, which I shall refer to hereinafter as a button, comprises a flat disk-shaped body 16 and a rim 17 which are integral and are formed of plastic or other rigid or semi-rigid insulation material. In the rim 17 there is an annular groove 18. A number of coils of resistance wire 19 are wound around the rim 17 at the bottom of the groove 18, and the ends 20 and 21 of this wire are projected through radial holes 22 in the rim on opposite sides of the body 16. The layer of resistance wire 19 at the bottom of the groove may be covered with a strip of insulation 23, and over that there may be wound varnished twine 24 or the like to fill up the groove and provide a flush surface for the periphery of the button.

The wire ends 20 and 21 extend inwardly to the center of the button where they are soldered at 25, 26, to copper or other sheet metal disks 27 and 28 which are snapped into annular rabbets in the rim 17 adjacent the body 16 and preferably cemented in place. These disks 27 and 28 then form terminals for the resistance unit.

The circular recesses 29 and 30 thus provided on the outer sides of the disks 27 and 28 are of a diameter to fit snugly over the disk-shaped terminal 12 and of a thickness slightly less than the thickness of that terminal in order that good electrical contact may be had when the button is pressed tightly against the terminal. Since the button is symmetrical it can obviously be mounted on the battery with either one of the disks 27 and 28 toward the terminal 12, and thus very little care need be exercised in making the assembly. When the assembly is made it is slipped into position between the spring arms 8 and 9, thereby completing the electric circuit. By the selection of a wire 23 of the proper resistance the current output of the battery may be regulated as desired.

Having thus described my invention, I claim:

1. In a resistance unit adapted to be abutted against the end of a battery having a terminal projecting therefrom, the combination of a flat body member formed of insulating material, said body member having a shape conforming to that of the end of the battery with which it is intended to be used and a peripheral groove in its outer edge, a terminal member fixed to one face of said body member and adapted to engage the terminal of the battery when the body member is abutted against the end of the battery, a second terminal member fixed to the other face of said body member, resistance wire wound around said body member and located within said groove, means for connecting one end of said resistance wire to one of said terminal members, and means for connecting the other end of said resistance wire to the other of said terminal members.

2. In a resistance unit adapted to be abutted against the end of a battery having a terminal projecting therefrom, the combination of a flat body member formed of insulating material and having a shape conforming to that of the end of the battery with which it is intended to be used, said body member having a peripheral groove in its outer edge and a recess in one face adapted to receive the terminal of the battery, a terminal member located in said recess and adapted to engage the terminal of the battery when the body member is abutted against the end of the battery, a second terminal member fixed to the other face of said body member, resistance wire wound around said body member and located within said groove, means for connecting one end of said resistance wire to one of said terminal members, and means for connecting the other end of said resistance wire to the other of said terminal members.

3. In a resistance unit adapted to be abutted against the end of a cylindrically-shaped battery having a terminal projecting therefrom, the combination of a disk-like member formed of insulating material, said member having a diameter equal to that of the battery with which it is intended to be used and a peripheral groove in its outer edge, a terminal member fixed to one face of said disk-like member and adapted to engage the terminal of the battery when the disk-like member is abutted against the end of the battery, a second terminal member fixed to the other face of said disk-like member, resistance wire wound around said disk-like member and located within said groove, means for connecting one end of said resistance wire to one of said terminal members, and means for connecting the other end of said resistance wire to the other of said terminal members.

4. In a resistance unit adapted to be abutted against the end of a cylindrically-shaped battery having a terminal projecting therefrom, the combination of a disk-shaped body member formed of insulating material and having a diameter equal to that of the battery with which it is intended to be used, said body member having a peripheral groove in its outer edge and a recess in one face adapted to receive the terminal of the battery, a terminal member located in said recess and adapted to engage the terminal of the battery when the body member is abutted against the end of the battery, a second terminal member fixed to the other face of said body member, resistance wire wound around said body member and located within said groove, means for connecting one end of said resistance wire to one of said terminal members, and means for connecting the other end of said resistance wire to the other of said terminal members.

5. In a resistance unit adapted to be abutted against the end of a cylindrically-shaped battery having a terminal projecting therefrom, the combination of a disk-shaped body member formed of insulating material and having a diameter equal to that of the battery with which it is intended to be used, said body member having a peripheral groove in its outer edge and a recess in each face adapted to receive the terminal of the battery, terminal members located in said recesses and adapted to engage the terminal of the battery when the respective face of the body member is abutted against the end of the battery, resistance wire wound around said body member and located within said groove, means for connecting one end of said resistance wire to one of said terminal members, and means for connecting the other end of said resistance wire to the other of said terminal members.

6. In a resistance unit adapted to be abutted against the end of a cylindrically-shaped battery having a terminal projecting therefrom, the combination of a disk-shaped body member formed of insulating material and having a diameter equal to that of the battery with which it is intended to be used, said body member having a peripheral groove in its outer edge and a recess in each face adapted to receive and conform to the terminal of the battery so as to prevent relative transverse movement between the battery and said body when said body is applied to the end of the battery, terminal members located in said recesses and adapted to engage the terminal of the battery when the respective face of the body member is pressed against the end of the battery, resistance wire wound around said body member and located within said groove, means for connecting one end of said resistance wire to one of said terminal members, and means for connecting the other end of said resistance wire to the other of said terminal members.

7. In a resistance unit adapted to be abutted against the end of a cylindrically-shaped battery having a terminal projecting therefrom, the combination of a disk-shaped body member formed of insulating material and having a diameter equal to that of the battery with which it is intended to be used, said body member having a peripheral groove in its outer edge and an undercut recess in each face adapted to receive and conform to the terminal of the battery so as to prevent relative transverse movement between the battery and said body when said body is applied to the end of the battery, sheet metal terminal members located in said recesses with their peripheral edges extending into said undercuts, each of said terminal members being adapted to engage the terminal of the battery when the face of the body member within which it is located is pressed against the end of the battery, resistance wire wound around said body member and located within said groove, means for connecting one end of said resistance wire to one of said terminal members, and means for connecting the other end of said resistance wire to the other of said terminal members.

8. In combination, a pair of spaced spring clips with parallel gripping arms and a battery resistance assembly mounted between said arms, said assembly comprising a cylindrically-shaped battery having a terminal at one end in engagement with one of said arms and a second terminal projection from the other end and a resistance unit abutted against the last-mentioned end of said battery and interposed therebetween and the other of said arms, said resistance unit comprising a disk-shaped body member formed of insulating material and having a diameter equal to that of the battery, said body member having a peripheral groove in its outer edge and a recess in the face abutting the end of the battery, which recess receives and conforms to the terminal of the battery whereby relative transverse movement between the battery and resistance unit is prevented, a terminal member located in said recess and engaging the terminal of the battery, a second terminal member fixed to the opposite face of said body member, resistance wire wound around said body member and located within said groove, means for connecting one end of said resistance wire to one of said terminal members, and means for connecting the other end of said resistance wire to the other of said terminal members.

ELMER A. SCHMIDT.

REFERENCES CITED

The following references are of record in the file of this patent:

UNITED STATES PATENTS

| Number | Name | Date |
|---|---|---|
| 618,057 | Crowdus | Jan. 24, 1899 |
| 825,882 | Harper | July 10, 1906 |
| 1,264,520 | Holmes | Apr. 30, 1918 |
| 1,400,914 | Schoenberg | Dec. 21, 1921 |
| 2,293,354 | Munchow | Aug. 18, 1942 |
| 2,299,184 | Slepian et al. | Oct. 20, 1942 |
| 2,352,576 | Triplett | June 27, 1944 |